Aug. 24, 1926. Re. 16,404

A. F. McNAUGHTON

CENTRIFUGAL WASHING MACHINE

Original Filed May 1, 1924

Inventor
A. F. McNaughton
by Fetherstonhaugh & Co
Attys.

Reissued Aug. 24, 1926. Re. 16,404

UNITED STATES PATENT OFFICE.

ALLAN FRASER McNAUGHTON, OF TORONTO, ONTARIO, CANADA.

CENTRIFUGAL WASHING MACHINE.

Original No. 1,537,995, dated May 19, 1925, Serial No. 710,363, filed May 1, 1924. Application for reissue filed May 10, 1926. Serial No. 108,206.

My invention relates to improvements in centrifugal washing machines, and the object of the invention is to devise means for providing a more efficient circulation of the contained water passing from the centre of the machine to the periphery and for a free return of the water from the periphery to the centre, said circulation being performed completely within the body of the machine, thereby dispensing with the use of return pipes, and it consists essentially of the arrangement and construction of parts hereinafter more particularly described.

In the drawings like characters of reference indicate corresponding parts in each figure.

Figure 1:
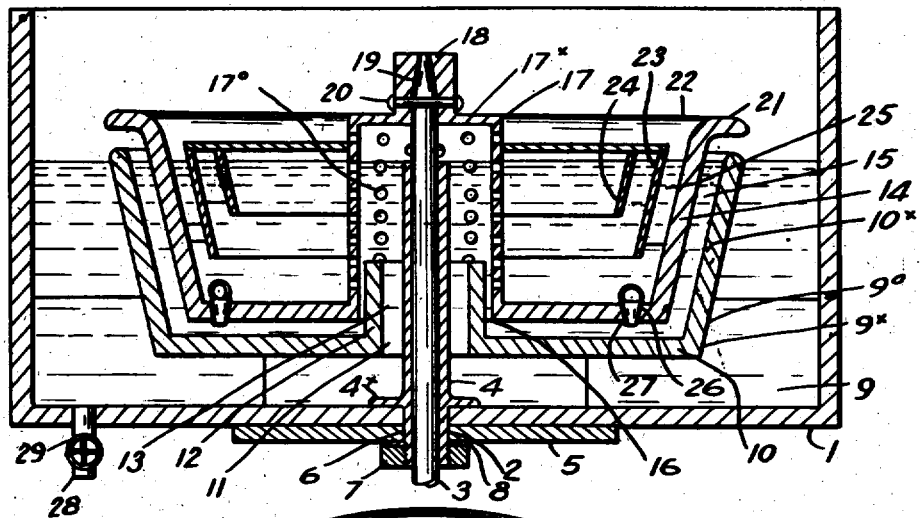
Fig. 1 is a sectional view through my machine.
Figure 2:
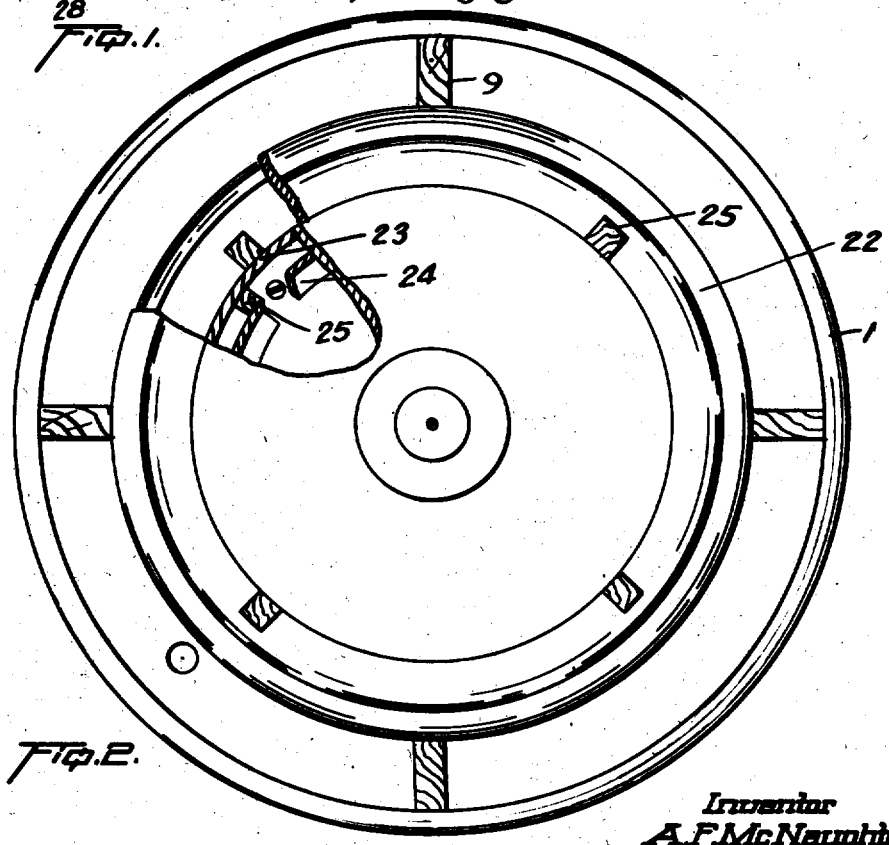
Fig. 2 is a plan view, the parts thereof being broken away in section to exhibit the interior structure thereof.

1 indicates the body or main container of my washing machine provided with a central opening 2 in the bottom wall thereof.

3 is an operating shaft journalled in a vertical bearing member 4 secured within the orifice 2.

5 is a plate which is secured to the bottom of the container 1 and provided with a central orifice 6 through which the lower end of the bearing support 4 extends. The bearing support 4 is provided with a flange $4^x$ bearing against the inner face of the bottom wall of the container 1.

7 is a securing nut and 8 is a washer, the nut 7 being screwed on to the threaded lower end of the bearing support 4 so as to force the washer 8 against the plate 5 and the plate 5 against the bottom of the container 1, bringing the flange $4^x$ into direct contact with the bottom of the container. By this means a water-tight joint is formed round the central orifice 2 of the container 1.

9 are a plurality of stationary wall members or vanes contained within the main container 1 and set in a radial position to the centre of the container, the inner end of each wall 9 being located intermediately between the outer wall of the container and the centre thereof.

Each wall or vane 9 is provided with a notched recess $9^x$, in other words is L-shaped for a purpose which will hereinafter appear, the outwardly extending edges of the recess $9^x$ being inclined outward as indicated at $9^o$.

10 is an inner container the bottom plate of which in proximity to its outer peripheral edge is supported in the notched recess $9^x$. The wall of the inner container 10 preferably flares outward, as indicated at $10^x$ and extends upwardly at least as high as the upper edges of the upwardly extending parts of the vanes 9.

11 is an orifice formed in the centre of the inner container 10 around which extends an annular flange 12 forming an annular water containing space 13 extending between the wall 12 and the bearing member 4.

The inner container 10 is supported in a stationary position upon the walls 9, and therefore forms a stationary unit with the main container 1.

14 is a revolving water container conforming in shape to the inner container 10, but of smaller diameter, and fitting therein to form a water containing interspace 15 between the side walls of the inner container 10 and revolving container 14 and also between the bottom of the container 10 and the bottom of the container 14. The revolving container 14 is provided with a central orifice 16 in the bottom thereof, into which the upwardly extending annular wall 12 of the inner container 10 extends.

17 is a cylindrical member extending upward from the orifice 16 and provided with a closed upper end $17^x$ having a central boss 18 provided with a central orifice 19 in which is secured the upper end of the main shaft 3 by a pin 20. The wall of the cylindrical portion 17 is provided with perforations $17^o$. The upper edge of the wall of the revolving container 14 is provided with an out-turned horizontal annular lip 21, the intermediate edge portion 22 being preferably convexed to permit of the free flow of water thereover.

The lip 21 extends over the upper edge of the inner container wall 10 in close proximity thereto.

23 and 24 are annular members, the walls of which are inclined to correspond with the incline of the wall of the container 14.

25 are ribs secured to the exterior of each member 23 and 24, the outer face of the ribs having inward inclination corresponding to the inclined inner surface of the container 14 so that when the member 23 is set within the revolving container 14, the ribs fit the inner periphery of the container 14 and tend to wedge downward so as to hold the member from rotating within such rotating container.

Similarly the rib 25 of the member 24 fits within the member 23 so as to prevent its revolving within such member. It will also be noted that the member 24 is of less depth than the member 23 for a purpose which will hereinafter appear.

Although I have shown two of these members it will of course be understood that any number may be employed.

26 is a discharge orifice provided with a plug 27 by means of which the water is discharged from the revolving container.

28 is a discharge pipe provided with a valve 29 for discharging the water from the main container 1.

Having described the principal parts of my invention I will briefly describe the operation of the same.

The clothes are inserted within the washing machine between the perforated wall of the cylindrical member 17 and the wall of the inner member 24, the clothes sinking down on to the bottom of the rotating water container 14. Water is fed by suitable means into the main container 1, the water passing upward and seeking its own level within the inner container 10 and rotating container 14. The shaft 3 is then driven by suitable means, rotating the container 14 with the clothes therein exerting a centrifugal action upon the water, causing it to pass upward over the convexed edge 22 and lip 21 into the main container, such water being replaced by water from the main container rising upward through the orifice 11 into the cylindrical member 17 and through the perforations into the revolving container.

The centrifugal action thus exerted is also aided by means of the members 23 and 24 and their inclined ribs 25 which engage the body of water within the revolving container 14 and serve to aid in throwing the water upward and over the lip 21.

By making the inner member 24 of less depth than the outer member 23 the water in the lower portion of the revolving container engages the outer wall thereof, passing up the inclined wall so as to be engaged by the outer inclined ribs 25 and thus be thrown upward over the lip 21.

The water within the revolving container 14 above the level of the lower edge of the member 23 is brought into contact as it is carried out by centrifugal action with the lower portion of such wall, and is therefore carried up through the interspace between said wall and the wall of the member 24, its movement being aided by the ribs 25 located between these walls.

It will thus be seen that a complete circulation is formed, the water passing upward and outward from the revolving container and from the clothes over the lip 21 into the outer portion of the main container, gradually circulating downward between the wall of the main container and the wall of the inner container 10 and returning between the bottom of the main container and the bottom of the inner container 10 so as to pass upward through the orifice 11 and through the perforations 170 of the cylindrical member 17 back into the revolving container 14 and into the body of the clothes contained therein.

The flow of the water between the walls and bottoms of the inner and outward fixed containers is materially aided by the walls or vanes 9 which serve to prevent rotary motion of the water and utilize its energy in a downward and then radial and inward direction.

I find in practice that it is of importance to separate the inflowing water at the bottom of the outer container from the bottom of the rotating container by means of the fixed bottom of the so-called container 10, as this inflowing water exerts considerable upward pressure which it is not desirable to have acting directly on the bottom of the revolving container.

It is also important that the means employed to form with the outer container the return passages for the water should have an upwardly extending wall as downward and inward flow of water directly in contact with the under side of the revolving container is thus in main prevented.

It is further important that the vanes should extend upwardly between the wall of the so-called inner container and the wall of the outer container so as to check rotary movement and start the water in a downward course with a minimum of eddying, as efficiency of operation with a minimum of power depends on cutting down frictional losses in the water circulations as much as possible.

From this description it will be seen that I have devised a very simple form of washing machine in which a very efficient circulation is provided for the water, both in an inward and outward direction whereby the use of return pipes is dispensed with.

What I claim as my invention is:

1. In a centrifugal washing machine, the combination with an outer container and a central shaft journalled in the bottom of the container and extending upward thereinto, of an inner stationary container supported within the outer container in a spaced apart position from the walls and bottom of the outer container and having a central orifice in the bottom thereof provided with a surrounding annular flange, a revolving container forming a clothes receptacle and supported within the inner container in spaced apart relation thereto and having an imperforate outer wall and a central orifice into which the aforesaid annular flange extends, and a perforated cylindrical portion extending upward from round the central orifice of the revolving container and secured at its upper end to the operating shaft.

2. In a centrifugal washing machine, the combination with an outer container and a central shaft journalled in the bottom of the container and extending upward thereinto, of an inner container supported within the outer container in a spaced apart position from the walls and bottom of the outer container and having a central orifice in the bottom thereof provided with a surrounding annular flange, a revolving container forming a clothes receptacle and supported within the inner container in spaced apart relation thereto and having an imperforate outer wall and a central orifice into which the aforesaid annular flange extends, a perforated cylindrical portion extending from the revolving container round the central orifice thereof and secured at its upper end to the operating shaft, and an annular discharge lip extending outward from the upper edge of the revolving container over and adjacent to the upper edge of the inner container.

3. In a centrifugal washing machine, the combination with an outer container and a central shaft journalled in the bottom of the container and extending upward thereinto, of an inner container supported within the outer container in a spaced apart position from the walls and bottom of the outer container and having a central orifice in the bottom thereof provided with a surrounding annular flange, a revolving container forming a clothes receptacle and supported within the inner container in spaced apart relation thereto and having an imperforate outer wall and a central orifice into which the aforesaid annular flange extends, a perforated cylindrical portion extending from the revolving container round the central orifice thereof and secured at its upper end to the operating shaft, and means located within the revolving container for increasing the centrifugal outward flow of the water over the upper edge of such container when revolved.

4. In a centrifugal washing machine, the combination with an outer container and a central shaft journalled in the bottom of the container and extending upward thereinto, of an inner container supported within the outer container in a spaced apart position from the walls and bottom of the outer container and having a central orifice in the bottom thereof provided with a surrounding annular flange, a revolving container forming a clothes receptacle and supported within the inner container in spaced apart relation thereto and having an imperforate outer wall and a central orifice into which the aforesaid annular flange extends, a perforated cylindrical portion extending from the revolving container round the central orifice thereof and secured at its upper end to the operating shaft, and an annular wall member supported within the rotating container in spaced apart relation to the wall thereof and upwardly extending ribs located in the interspace formed between such wall member and the wall of the rotating container.

5. In a centrifugal washing machine, the combination with an outer container and a central shaft journalled in the bottom of the container and extending upward thereinto, of an inner container supported within the outer container in a spaced apart position from the walls and bottom of the outer container and having a central orifice in the bottom thereof provided with a surrounding annular flange, a revolving container forming a clothes receptacle and supported within the inner container in spaced apart relation thereto and having an imperforate outer wall and a central orifice into which the aforesaid annular flange extends, a perforated cylindrical portion extending from the revolving container round the central orifice thereof and secured at its upper end to the operating shaft, a plurality of annular wall members fitting within the revolving container one within the other, and spaced apart from the bottom thereof, and rib members carried by such wall members and adapted to hold them in spaced relation.

6. A washing machine comprising an outer stationary receptacle, an inner revolving container having a central bottom inlet, an intermediate stationary container also having a central orifice in its bottom wall, and means for directing the water carried circumferentially around the outside of the intermediate stationary container downward and inward to the central orifice of the intermediate container to pass upward therethrough.

7. A washing machine comprising an outer stationary receptacle, an inner revolving container having a central bottom inlet, an intermediate stationary container also having a central orifice in its bottom wall, and stationary water directing vanes extending outward from the internal periphery of the stationary receptacle.

8. In a centrifugal washing machine, the combination of an outer container, a central vertical shaft therein, a revoluble container forming a clothes receptacle suitably connected to the shaft and having a central orifice in its bottom, L-shaped guide vanes fitted to the bottom of the outer container and extending part way up the outer wall thereof, and a circular plate fitted over the lower parts of the vanes provided with a central orifice and having a wall extending up within the upwardly extending parts of the vanes to thus form passageways adapted to lead water thrown out from the receptacle downwardly and inwardly to the central orifice of the revoluble container.

ALLAN FRASER McNAUGHTON.